Oct. 10, 1933.  S. A. LE ROY  1,929,644
RETORT CLOSURE
Filed April 25, 1932

INVENTOR.
Sherwood A. LeRoy
BY Miller Boyken & Bried
ATTORNEYS.

Patented Oct. 10, 1933

1,929,644

UNITED STATES PATENT OFFICE 1,929,644

RETORT CLOSURE

Sherwood A. Le Roy, Alhambra, Calif., assignor to Processco, Limited, San Francisco, Calif., a corporation of Nevada Application April 25, 1932. Serial No. 607,372

3 Claims. (Cl. 220—55)

This invention relates to closures for openings in retorts and the like and has for its objects improvements in the type of mutilated thread screw closure shown in the Trumble Patent No. 1,653,137, whereby certain advantages over said type are realized as will more particularly appear in the following description and accompanying drawing.

Figure 1:
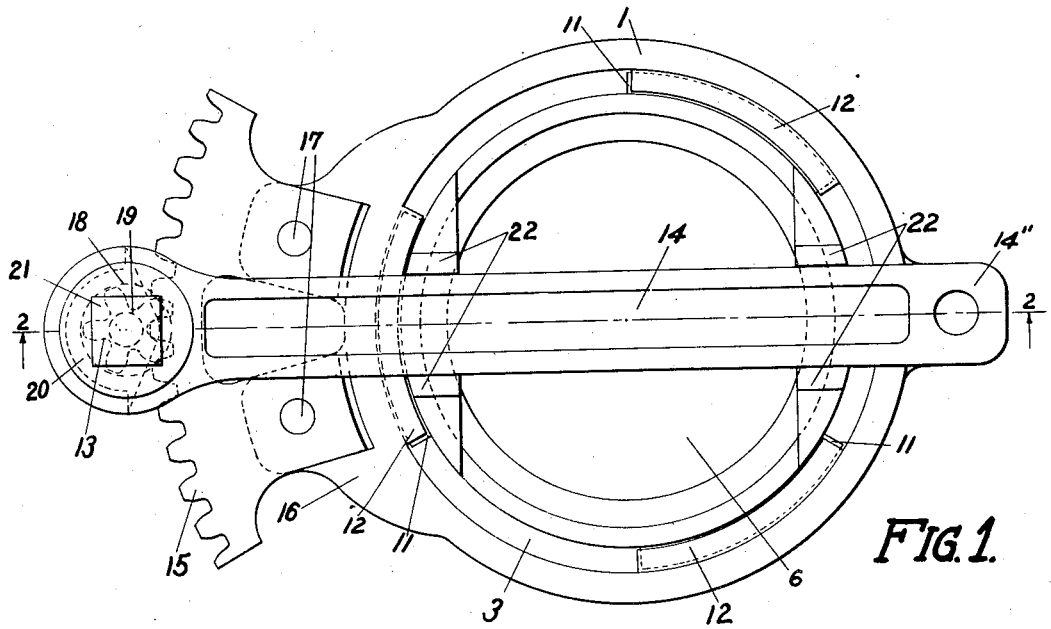
Figure 2:
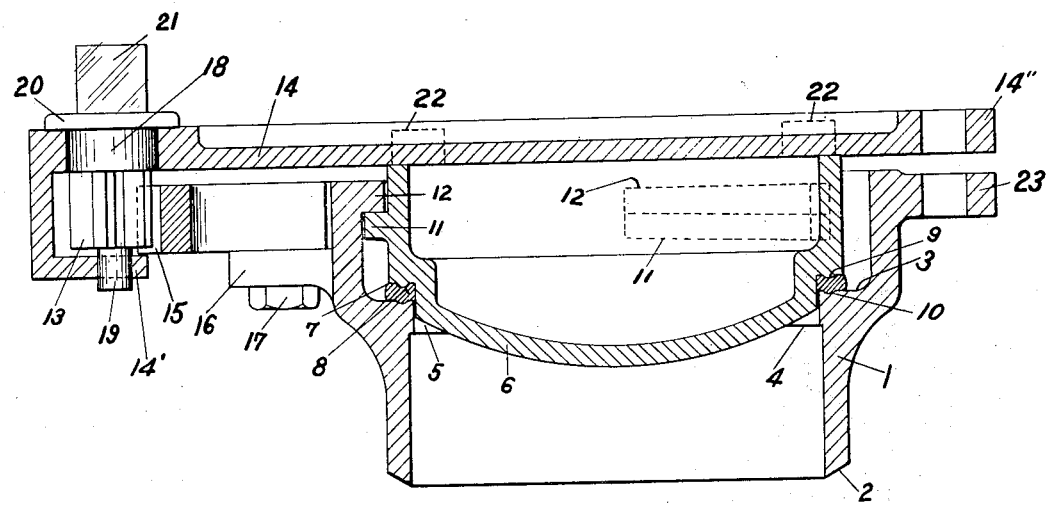

In the drawing Fig. 1 is a plan view of my improved retort closure, and Fig. 2 is a vertical section of the closure as seen from the line 2—2 of Fig. 1.

Briefly described the closure comprises a specially formed neck member constituting the opening for the retort, tank, still, or other receptacle, provided with a seat to receive a mechanically rotatable head or sealing member held in place against the seat by means of a mutilated thread so that it may be released or clamped in place upon a fractional turn. The invention involved relates to constructional details.

With reference to the drawing 1 is a circular or tubular metal neck member, usually of cast steel, and formed at 2 with a beveled edge to facilitate welding to the body of a metal tank, retort shell, tube still or other similar receptacle, which at 3 has an annular shoulder or seat formed by an abrupt enlargement of the internal diameter of the member. The internal diameter is also enlarged slightly, below the shoulder from line 4, so as to provide a slightly reduced throat 5 adjacent the shoulder and which throat is bored to nicely receive the outer turned diameter of the sealing head 6 which is formed with a shoulder 7 overhanging shoulder 3 and interposed between which shoulders is a soft metal or other gasket ring 8. A feature of the invention at this point is a rounded annular bead 9 on the shoulder of the head and a complementarily formed groove 10 in the shoulder of the seat, or vice versa.

The head member 6 is cup-shaped and is provided on its outer diameter with spaced segments 11 (preferably three) of a machined thread adapted to engage three similar thread segments 12 formed on the inner diameter of the neck member, the length of the segments being such as to free the threaded engagement of the parts upon a third of a revolution so that the head can be then axially inserted and removed. Attention is called to the fact that these threads have flat contact faces extending at right angles to the axis of the head and not at an angle as heretofore, as frequent causes of leakage were found caused by angular face thread contact which upon tightening the head lifted one side slightly relative to the other rather than to center the head as would ordinarily be supposed. This was due to the great weight of these heads and friction of the parts not permitting centering through pressure of angular thread faces no matter how smooth they may be.

The head is mechanically rotated by means of a small pinion 13 carried on an arm 14 attached to the head and which pinion engages a gear segment 15 secured to a lug or lugs 16 cast to and projecting outwardly from the side of the neck member 1. This gear segment 15 is machined before attaching in place as by tap bolts 17 and if desired may also be welded in place. This is another point of importance in the construction.

The pinion 13 is formed with an inner bearing shank 18 a trifle larger than the outer diameter of the pinion, and also an outboard bearing pin 19 at the outer end of lesser diameter, and the arm 14 is bored to support the large bearing shank 18, returned around the outside of the pinion and bored to also embrace the outboard bearing pin 19 to thus rotatably support the pinion at both ends while permitting it to be freely removed or replaced in position through the large bearing opening in the arm. A flange 20 formed on the end of shank 18 supports the pinion against the arm 14 and a square shank 21 provides for forcible turning of the pinion with a wrench. Note also that bearing pin 19 extends below the return portion 14' of the arm so that the pinion may be knocked out to release it if stuck.

The pinion being carried on a separate arm or bar 14 is an important feature, as this arm passes over the top of the closure head 6 between two pairs of lugs 22 to which it is welded after adjusting to insure correct meshing of the pinion with the gear segment, and the bar passing over the head forms a handle for aid in manipulating the head or supporting it from a chain if very large and heavy. The bar is here shown with an extension 14" with an opening to match a similar opening in a lug 23 on member 1, for locking the parts in sealed relation, but this is optional construction.

The length of the gear segment 15 is such as to freely clear the pinion when the mutilated threads are in position to permit withdrawal of the head, and bring the head to a firm seat when in about the position shown.

While I term the device a "retort" closure, it is understood that no limitation is implied thereby as it may be used for closing any opening requiring such a construction, and in some instances the neck member 1 may be an integral part of the retort or other receptacle on which the closure is used.

Having thus described the features of my improved retort closure, what I claim is:

1. A closure of the character described comprising a tubular neck member provided with an internal seating shoulder and mutilated threads outwardly of the shoulder, a sealing head arranged to fit within the threaded neck member and seat against said shoulder, said sealing head provided with mutilated threads engaging the threads of the neck member, gear teeth carried by the neck member, a bar secured across the top of the sealing head, and a pinion rotatably carried by the bar engaging said gear teeth.

2. A closure of the character described comprising a tubular neck member provided with an internal seating shoulder and mutilated threads outwardly of the shoulder, a sealing head arranged to fit within the threaded neck member and seat against said shoulder, said sealing head provided with mutilated threads engaging the threads of the neck member, gear teeth carried by the neck member and projecting outwardly therefrom, a bar secured across the top of the sealing head and forming a handle, a pinion rotatably carried by the bar engaging said gear teeth, said bar formed with bearings supporting the pinion at both ends, and one of said bearings of a diameter to permit axial withdrawal of the pinion.

3. A closure of the character described comprising a tubular neck member provided with an internal seat and mutilated threads, a sealing head member complementarily threaded to screw within said neck and seat thereagainst, a segment gear carried by the neck member, and a pinion rotatably carried by an extension of the head member engaging said gear, said extension formed with a bearing opening large enough to permit passage of the pinion therethrough, and said pinion formed with a bearing hub portion as large as the pinion diameter having rotative bearing in said opening, and a flange at the end of said hub larger than the pinion resting against said extension, all whereby the pinion is free to be withdrawn through said opening.

SHERWOOD A. LE ROY.